UNITED STATES PATENT OFFICE.

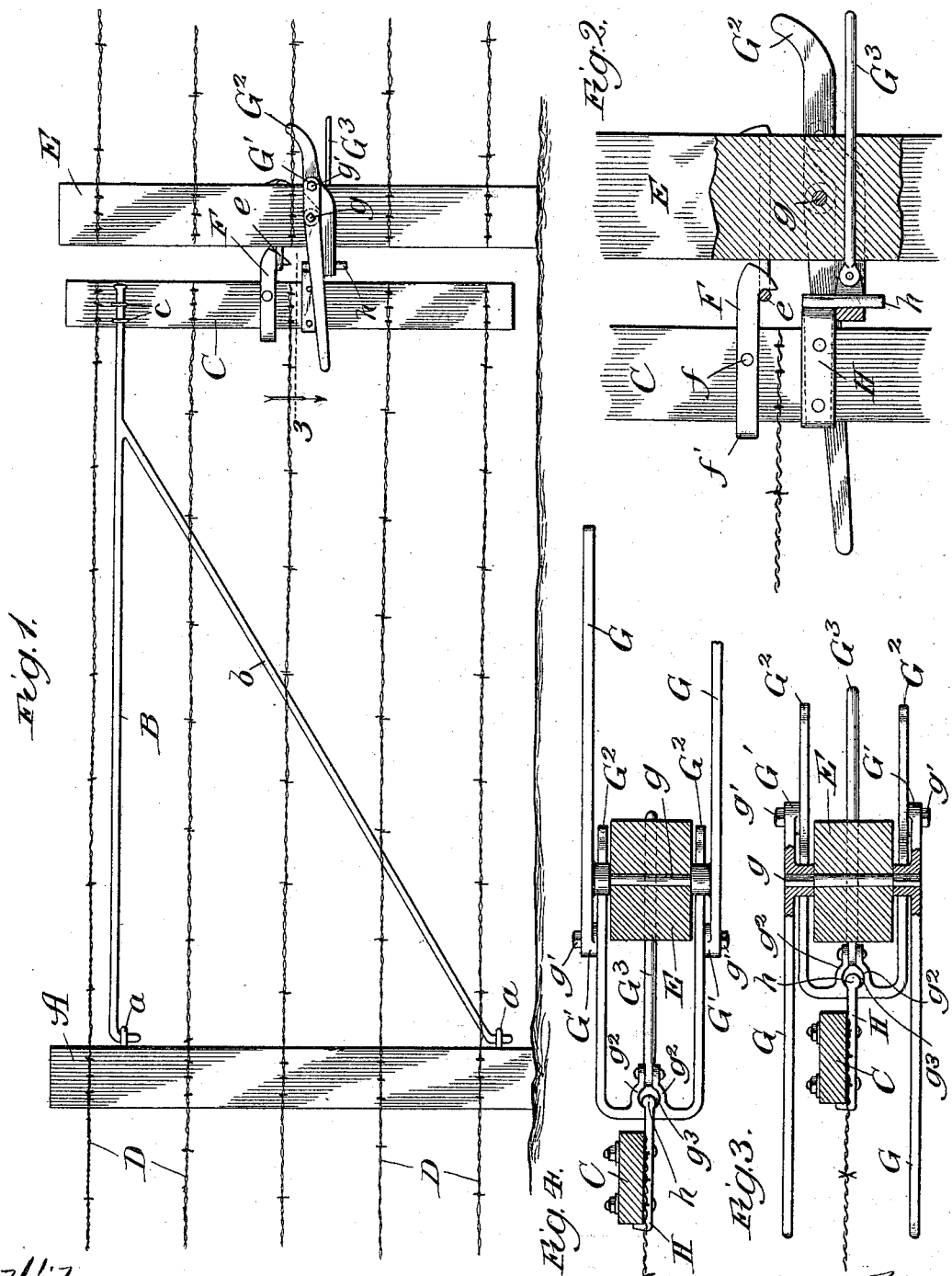

HORATIO N. HOBART, OF ELGIN, ILLINOIS, ASSIGNOR OF ONE-HALF TO RICHARD N. BOTSFORD, OF SAME PLACE.

GATE.

SPECIFICATION forming part of Letters Patent No. 625,768, dated May 30, 1899.

Application filed November 14, 1898. Serial No. 696,436. (No model.)

*To all whom it may concern:*

Be it known that I, HORATIO N. HOBART, a citizen of the United States, residing at Elgin, Illinois, have invented certain new and useful Improvements in Gates, of which the following is a specification.

The invention relates to farm and lawn gates and fastenings therefor.

The object of the invention is to provide a gate of barbed wire or woven wire which will form a part of a barbed or woven wire fence as little distinguished as possible from the remainder of the fence; and the invention consists in the features and details of construction hereinafter described and claimed.

In the drawings, Figure 1 is a side elevation of my improved barbed or woven wire fence-gate. Fig. 2 is an elevation, partly in section, of the gate-post and the locking mechanism. Fig. 3 is a plan view of a section, taken in the line 3 of Fig. 1 when the gate is in its locked position; and Fig. 4 is a plan view of the same, showing the parts in their position when the gate is unlocked.

In making my improved barb or woven wire fence-gate and fastener I insert in a post A eyes or staples $a$. From the upper of these eyes or staples I carry a rod B forward in a horizontal position and provide it with a brace-rod $b$, attached to rod B near its front end and extending downwardly and backwardly to the lower one of the eyes or staples in the post. The rod B is of the length desired for the gate—eight, ten, or twelve feet, as may be preferred. I take a piece of board C for the front vertical bar of the gate of the desired width and thickness and of a length suitable for the height of the gate—four, five, or six feet, as may be preferred—and provide it with eyes or staples $c$ near its upper end. These eyes or staples are intended to receive the front end of the rod B loosely and so that they may slide freely back and forth on the rod B a desired distance. The strands of barbed wire D are fastened to the post A in the usual way and are extended forward to the front vertical bar C of the gate, to which they are attached in any desired way. A fence-post E, adjacent to the front vertical bar of the gate, forms the other gate-post, to which it is intended that the gate when shut shall be locked as an additional mode of fastening the gate when closed. An eyebolt $e$ passes through the post and is adapted to receive the hook of a catch F, pivotally attached at $f$ to the front vertical bar of the gate. The hook of the catch is thrown out of engagement with the eye by bearing down on the rear extended end $f'$ of the catch which lifts the hook out of the eye. Inasmuch, however, as it is necessary that the strands of barbed wire should be in a taut and firm condition when the gate is closed, it is necessary to have some means for drawing the front vertical bar of the gate forward a desired distance in the act of locking the gate. To this end I employ levers G, connected together by a bolt or shaft $g$, passing through the post E. The short ends G' of the levers are pivotally connected at $g'$ with the members $G^2$ of a U-shaped piece passing along the sides of the post and across between the post and the front vertical bar of the gate, where ears $g^2$ are provided, in which a bolt or pin $G^3$ is pivoted and extended back through the post E, so that it can move back and forth in the hole containing it. The ears $g^2$ furnish a hole $g^3$, adapted to receive a hook or pin $h$ on the catch H, fastened by bolts or otherwise to the front vertical bar of the gate, which also constitutes the main or important feature of the fastenings provided for holding the gate when closed. This hook or pin can be removed from the hole or eye $g^3$ by lifting the gate in a vertical direction. To permit this, the eyes or staples $a$, as will be readily understood, should be made large enough to allow the ends of the rod B and the brace $b$ to move enough to adjust themselves to the change in their position caused by raising the front vertical bar C of the gate.

When the levers G are in the position shown in the first three figures of the drawings, the U-shaped piece is moved to its position of nearest approach to the post E, and when they are in the position shown in Fig. 4 it is moved to its position of greatest distance from the post. When in the position shown in Fig. 4, the gate is unlocked, and all that is necessary is to lift it up so that the hook or pin $h$ will be moved out of its hole or eye, when the gate may be opened. To lock the gate, the levers are thrown back into the position shown in the first three figures of the drawings. This causes the U-shaped piece to move up toward the post E and draws the front vertical bar of the gate with it, so as to make the strands taut and firm, and securely locks the gate independently of the catch F. As it moves to its locking position the hook on the catch F slides over the staple or eye $e$ and drops into its locking position. The levers G in dropping into their locking position pass the dead-center, so that there is no danger of their accidentally being thrown over into their unlocking position.

When the gate is unlocked to be opened, it is evident that inasmuch as it contains no bottom bar or horizontal frame-piece and inasmuch as the wires are in a loosened and relaxed condition the front vertical piece may be tipped or swung on the rod B, where it passes through the staples or eyes $c$, so that the lower portion of the gate may be swung up to readily pass over a snowdrift, ground of uneven surface, or other casual obstruction. The capacity of the front bar to be swung or oscillated on its pivoted connection with the rod B into a horizontal or semihorizontal position, lifting the strands of wire at the front end of the gate, obviates the necessity of clearing away snowdrifts or other temporary obstructions when the gate is to be opened.

What I regard as new, and desire to secure by Letters Patent, is—

1. In a barb or woven wire fence-gate and fastener, in combination with a front vertical bar, an upper horizontal rod connected to the vertical bar by means which permit such bar to slide and turn on the horizontal rod as an axis, an inclined brace-rod, and horizontal strands or meshes of wire, substantially as described.

2. In a barb or woven wire fence-gate and fastener, in combination with a front vertical bar, horizontal strands of barbed or woven wire, a gate-post arranged in relation to the front vertical bar, a U-shaped yoke passing along the sides of the gate-post and across between such post and the vertical bar, a catch mounted on the vertical bar and engaging the U-shaped yoke, levers pivoted in the gate-post and at their short ends to the U-shaped yoke, whereby as such levers are turned or oscillated the U-shaped yoke and the front vertical bar of the gate are moved toward and from the post, substantially as described.

3. In a barb or woven wire fence-gate and fastener, in combination with a front vertical bar, horizontal strands of barbed or woven wire, a gate-post arranged in relation to the front vertical bar, and provided with an eye or staple, a pivoted catch mounted on the front vertical bar adapted to have its hook engage the staple or eye on the gate-post, and means for moving the front vertical bar of the gate toward the gate-post to permit an engagement of the hook with the eye or staple, substantially as described.

HORATIO N. HOBART.

Witnesses:
 THOMAS A. BANNING,
 THOMAS B. MCGREGOR.